United States Patent [19]

Katsuno

[11] Patent Number: 5,404,551
[45] Date of Patent: Apr. 4, 1995

[54] PARALLEL PROCESSOR WHICH PROCESSES INSTRUCTIONS, AFTER A BRANCH INSTRUCTION, IN PARALLEL PRIOR TO EXECUTING THE BRANCH INSTRUCTION AND ITS PARALLEL PROCESSING METHOD

[75] Inventor: Akira Katsuno, Kawasaki, Japan

[73] Assignee: Fujitsu Limited, Kanagawa, Japan

[21] Appl. No.: 795,145

[22] Filed: Nov. 20, 1991

[30] Foreign Application Priority Data

Nov. 20, 1990 [JP] Japan .................. 2-314607

[51] Int. Cl.⁶ .................. G06F 9/28; G06F 9/30; G06F 9/38
[52] U.S. Cl. .................. 395/800; 364/229.5; 364/229; 364/230.2; 364/230.3; 364/231.8; 364/243.42; 364/247.6; 364/262.4; 364/263.1; 364/263.2; 364/263.3; 364/DIG. 1; 364/DIG. 2
[58] Field of Search .............. 395/800, 375, 400, 575, 395/550, 500, 425, 775, 325, 250, 275, 200, 725; 364/766, DIG. 1, DIG. 2

[56] References Cited

U.S. PATENT DOCUMENTS

| | | | |
|---|---|---|---|
| 4,430,706 | 2/1984 | Sand | 395/375 |
| 4,766,566 | 8/1988 | Chuang | 395/375 |
| 4,980,819 | 12/1990 | Cushing et al. | 395/375 |
| 5,006,980 | 4/1991 | Sanders et al. | 395/375 |
| 5,019,967 | 5/1991 | Wheeler et al. | 395/775 |
| 5,155,817 | 10/1992 | Kishigami et al. | 395/375 |
| 5,155,843 | 10/1992 | Stamm et al. | 395/575 |
| 5,218,712 | 6/1993 | Cutler et al. | 395/800 |
| 5,237,525 | 8/1993 | Rossbach | 364/766 |

OTHER PUBLICATIONS

Patent Abstracts of Japan, vol. 014, No. 201 (P-1041) Apr. 4, 1990, JP-A-2042534, Feb. 13, 1990, "Microprocessor".

IEEE Transactions on Computers, vol. C-36, No. 12, Dec. 1987, N.Y., U.S., Wen-Mei W. Hwu and Yale N. Patt, "Checkpoint Repair For High-Performance Out-of-Order Execution Machines".

*Primary Examiner*—Alyssa H. Bowler
*Assistant Examiner*—Daniel H. Pan
*Attorney, Agent, or Firm*—Nikaido, Marmelstein, Murray & Oram

[57] ABSTRACT

In a typical operating system, one-third of a program consists of branch instructions. This means a performance of a processor of a typical operating system depends greatly on whether or not an instruction before and after a branch instruction can be executed in parallel. In order to provide a high performance processor with parallel processing, provided is a structure with a plurality of operating units and a plurality of registers where a set of registers are specified with the same address. A selection sequence of registers is stored by a plurality of selection sequence storages. Contents of registers are determined or not depending on the information stored in a plurality of determination identification storages. A register is specified by a register selector according to the contents of the selection sequence storages. This register selector is also used to update the contents of the selection sequence storages. The contents of the determination identification storages are rewritten by a determination identifier when the contents of a register proves to be a correct result.

8 Claims, 8 Drawing Sheets

PARALLEL PROCESSOR WHICH PROCESSES INSTRUCTIONS, AFTER A BRANCH INSTRUCTION, IN PARALLEL PRIOR TO EXECUTING THE BRANCH INSTRUCTION AND ITS PARALLEL PROCESSING METHOD

FIELD OF THE INVENTION

The present invention relates to a processor comprising a plurality of operating units for executing a parallel process.

BACKGROUND OF THE INVENTION

One method of improving the processing speed of a processor is to provide a plurality of operating units for executing a parallel process.

BACKGROUND OF THE INVENTION

FIG. 1 shows a configuration of a prior invention.

In this prior invention, an instruction fetch circuit 2 reads an instruction stored in a main memory, not shown in FIG. 1. The read address equals the value indicated by a program counter provided in the instruction fetch circuit 2.

An instruction read by the instruction fetch circuit 2, that is, a so-called instruction, is added to an instruction schedule decoding circuit 3. The instruction schedule decoding circuit 3 decodes the instruction to determine its nature, and determines a corresponding operating schedule. Then, it controls a plurality of operating units 1—1—1-3 according to its operating schedule.

The operating units 1—1—1-3 are connected to a register file 4. They read the contents of the register file 4, and store the operation results in it.

The register file 4 comprises a plurality of registers. The output of the operating units 1—1—1-3 is stored in a register specified by the instruction schedule decoding circuit 3. The instruction schedule decoding circuit 3 outputs a register address, and a register in the register file 4 specified by the register address is activated to output and store data.

The configuration shown in FIG. 1 comprises a plurality of operating units 1—1—1-3, and the instruction schedule decoding circuit 3 controls them to work in parallel, thus improving the execution speed of a program in the main memory. A processor normally executes programs sequentially, so processing programs in parallel is inefficient. The main reason for this is as follows:

For example, in the first step, a sum of a register R0 and a register R1 is applied to the register R0, and in the second step, an instruction written after a branch instruction in a program cannot be executed before the branch instruction when the program branches according to the contents of the register 0. Therefore, in the prior art technology, instructions written before and after a branch instruction cannot be executed in parallel.

Generally, the rate of a branch instruction in a program is comparatively large. For example, in a typical operating system, one-third of a program is occupied by branch instructions. Therefore, the performance of a processor depends greatly on whether or not instructions before and after a branch instruction can be executed in parallel.

Generally, an instruction may be issued to be executed irregularly in the program sequence so that instructions can be executed concurrently and efficiently. In this case, the instructions may not be executed and terminated sequentially, that is, a following instruction can jump a preceding instruction to update the content of a register. Then, an interrupt arises, and a proper interrupt process may not be performed or the program may not be restarted after an appropriate interrupt process if instructions after the interrupting instruction have already updated the content of the register.

SUMMARY OF THE INVENTION

The present invention relates to a processor comprising a plurality of operating units, and aims at executing an instruction written after a branch instruction before executing the branch instruction in parallel and an appropriate interrupt process can be performed even when an out-of-order, that is, irregular execution of instructions is permitted in the program sequence.

A processor having a plurality of operating units for a parallel process comprises a plurality of registers where a pair of registers are specified with the same address; a plurality of selection sequence storages for storing the selection sequence of registers in the prior processes; determination identification storages for storing the identification of definitions of the content of each register; a register selection controller for selecting a pair of registers according to the contents of the selection sequence storages of the designated address and updating the contents of the selection sequence storages; and a determinative write identifier for rewriting the contents of the determination identification storages depending on whether or not the write is determined as correct, as a result, in the executing sequence of instructions.

DESCRIPTION OF THE PREFERRED EMBODIMENT

Figure 1:
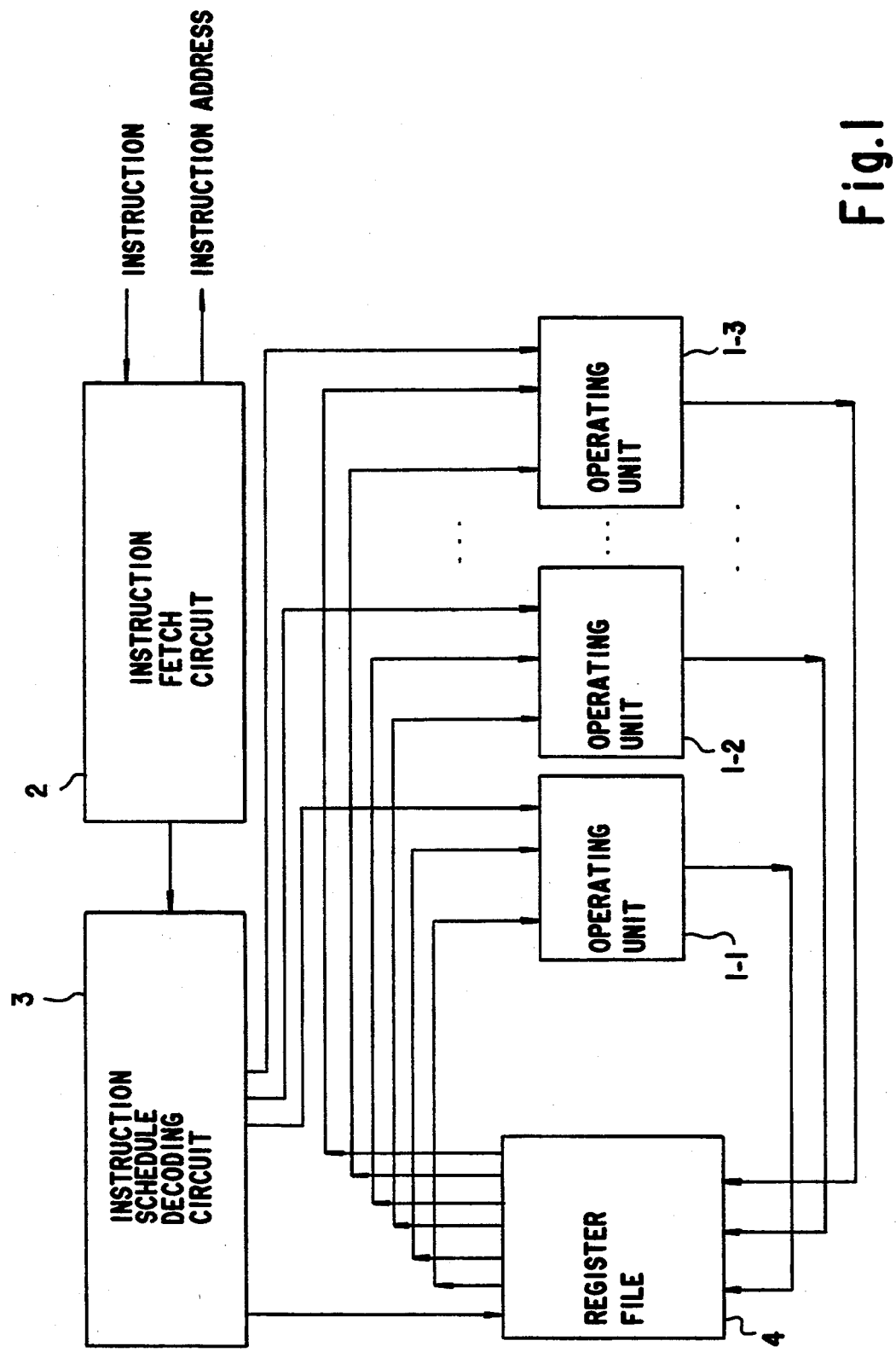
FIG. 1 shows a configuration of the prior art technology.
Figure 2:
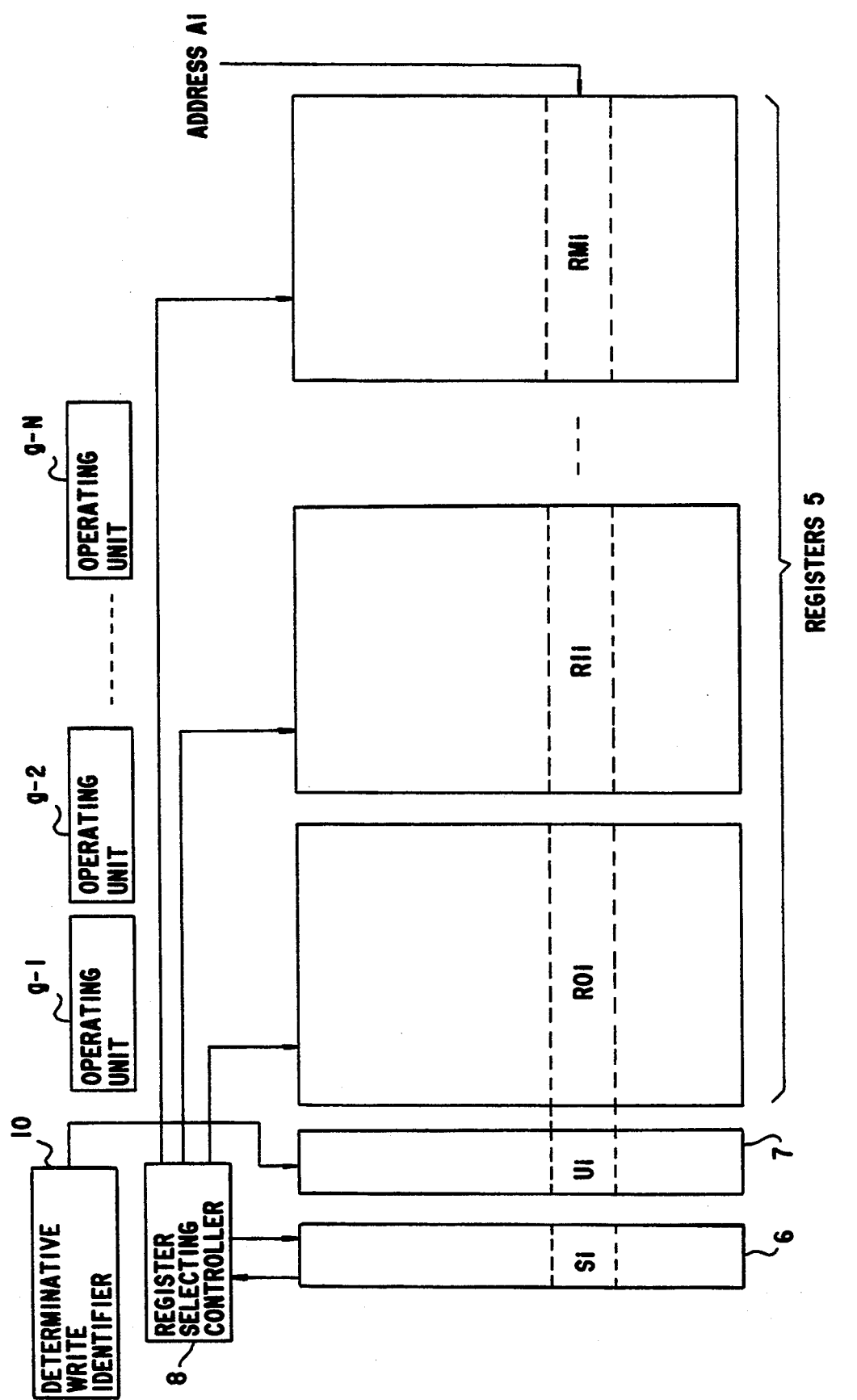
FIG. 2 shows a principle configuration of the present invention.

FIG. 2 shows a principle configuration of a processor associated with the present invention. The basic principle of the present invention is described first. A processor of the present invention comprises plural sets of operating units 9-1—9-N for performing a parallel process.

5 indicates registers and comprises plural sets (L sets) of registers R0i, R1i, —, RMi (i=1−L), which are specified with the same address. These registers R0i, R1i, —, RMi are accumulators for the preceding operating units.

6 indicates selection sequence storages. A selection sequence storages i for indicating the past selection sequence of the i-th set of registers R0i, R1i, —, RMi is provided for each set, and a selection sequence storage Si corresponding to each register is specified with the register designation address Ai. The selection sequence storage Si comprises, for example, an (M−1)-carry counter. Every time the i-th set of registers is selected, the counter is incremented and the registers R0i, R1i, —, RMi are specified cyclically in this order. For example, if the counter indicates a value 2 with M=3, the previous selection sequence is 2, 1, 0, 3, and the latest data are stored in a register R2i.

7 indicates determination identification storages, and comprises one determination identification storage Ui for each register set for indicating the determination of the content of each register R0i, R1i, —, RMi. A determination identification storage Ui corresponding to each register set is specified with a register specification address Ai.

8 indicates a register selection controller, and selects one of the register set R0i, R1i, —, RMi according to the content of a selection sequence storage Si at the specified address Ai when data are written to the register, thus updating the contents of the selection sequence storage Si when the selection sequence storage Si compresses the above counter, the contents of the selection sequence storage Si are updated by incrementing the counter.

10 indicates a determinative write identifier, and rewrites the contents of the determination identification storage Ui at the specified address Ai depending on whether or not a write is correct as a result in the execution order of instructions.

In a processor having the above described configuration, the contents of registers are read depending on the contents of each selection sequence storage Si and determination identification storage Ui. Using a processor of the present invention, an original state can be restored according to the contents of a selection sequence storage Si even though an instruction written after a branch instruction is executed in parallel with other instructions prior to the execution of the branch instruction and even though the process results in the no branch state. Therefore, an instruction written after a branch instruction can be executed in parallel prior to the execution of the branch instruction, thus improving the processing speed of a processor. Additionally, the processing speed of a processor can be increased when an interrupt or an exception condition exists in addition to a branch instruction.

The present invention comprises, in addition to the above described configuration, a write reservation flag and a write reservation identifier for easily controlling the write conflict to a register at the same address associated with a parallel process.

Each of the write reservation flags for indicating whether or not a write of data reservation is properly made to a corresponding register is assigned to each register set, thereby specifying a write reservation flag corresponding to the register R01, R1i, —, RMi at the register specification address Ai.

The write reservation identifier rewrites the contents of the write reservation flag to indicate that a write reservation is made at the write instruction decoding process when data are written to a corresponding register, and that the reservation is canceled after the completion of the write.

Figure 3:
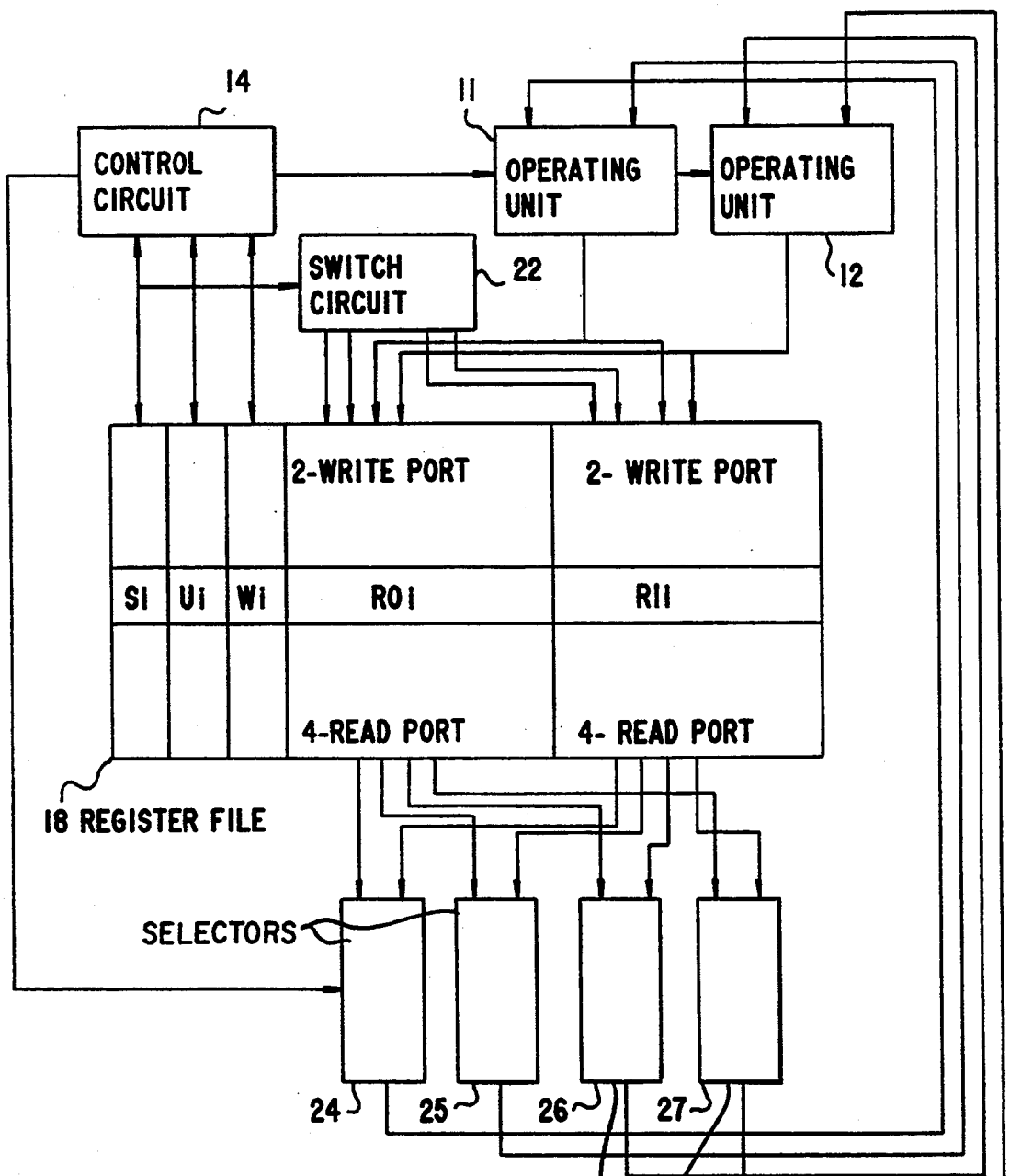
FIG. 3 shows a configuration of a processor of the first embodiment of the present invention.

FIG. 3 shows a configuration of a processor with a register file of the first embodiment of the present invention.

This processor comprises operating units 11 and 12 of the same configuration, and performs a parallel process under control of a control circuit 14. Either of the operation results provided by the operating units 11 and 12 is selected and supplied to a register file 18 simultaneously.

The register file 18 comprises registers RA0 and RA1, register selection flags S, uncertain flags U, and write reservation flags W. A set of these components R0i, R1i, Si, Ui, and Wi (i=1−M) are specified simultaneously with the address Ai. The registers R0i and R1i make a pair, and either of them may be used as a register Ri in a program. A register R0i or R1i cannot be specified directly in a program, but must be specified by hardware. Program registers R01 and R1i compress memories of 2-part write and four part read. Respective outputs of the 4-portread are selected by selectors 24, 25, 26 and 27 and are applied to operation units 11 and 12. The 2-part write is designated by a control signal of switching circuit 22 in a write timing. In detail, one set of components in the register file 18 comprising a register R0i, R1i, register selection flag Si, uncertain flag Ui, and write reservation flag Wi is regarded as a register Ri in executing a program.

For example, when a register Ri is a destination register in a program, either the register R01 or R1i is selected depending on the contents of the selection flag S. The register R0i is selected when the selection flags shows 0; and the register R1i is selected when it shows 1. The control circuit 14 controls which register to select depending on the value of the selection flag S. The operation unit 11 or 12 performs an operation with a reservation flag Wi of the selected register set to 1. A processor of an embodiment of the present invention comprises two operating units, either of which is selected by the control circuit 14.

When the operating units 11 and 12 finish the operation, a reservation flag W1 of the selected register is set to 0. If this is the latter process in the parallel process, an uncertain flag is set to 1 until the former process is completed.

The operation of each part according to a register selection flag Si, a reservation flag Wi, an uncertain flag Vi, and their contents is described as follows:

For example, when data Di are written to the register Ri, it is specified as follows: a write enable signal WE inverts the contents of a register selection flag Si, and the inverted contents are read and provided for a control terminal of a switching circuit 22. When the content is zero (0), the switching circuit 22 applies the write enable signal WE provided thereto to a register group RA0 as a write enable signal WE0, and then selects the register R0i. Likewise, when the contents of the register selection flag Si is 1, the switching circuit 22 applies the write enable signal WE provided thereto to a register group RA1 as a write enable signal WE1, and then selects the register R1i.

During the writing process, the uncertain flag Ui is set to 1 by the control circuit 14 if it is not determined that data are written correctly in due instruction sequence, and is turned to 0 when it is determined. For example, if an instruction written immediately before this write instruction is not executed completely, Ui equals 1, and is turned to 0 when the execution is completed.

The write reservation flag Wi is set to 1 by the control circuit 14 when a write instruction is decoded, and is set to 0 when the write is completed.

The contents of the registers R0i and R1i are applied to the selectors 24, 25, 26 and 27 when the register Ri is read. The selectors 24, 25, 26 and 27 are selection-controlled by the control circuit 24 according to the contents of the register selection flag Si and the uncertain flag Ui. When the register selection flag Si is set to 0, the contents of the register R1i are selected by the selector 24, and the contents of the register R0i are selected by the selector 26.

That is, two groups of data are read from register file 18 through selectors 24 and 25, and used by operating unit 11 in the operation according to signals provided by the control circuit. Two groups of data read through selectors 26 and 27 are executed by operating unit 12. For example, the output of the selector 24 is applied to the operating unit 10, and the output of the selector 26 is applied to the operating unit 12.

FIGS. 4A–4D show the variation of the contents of the register selection flag Si, uncertain flag Ui, write reservation flag Wi, register R0i, and the register R1i when data C are written to the address Ai of the register file 18.

Figure 4A:
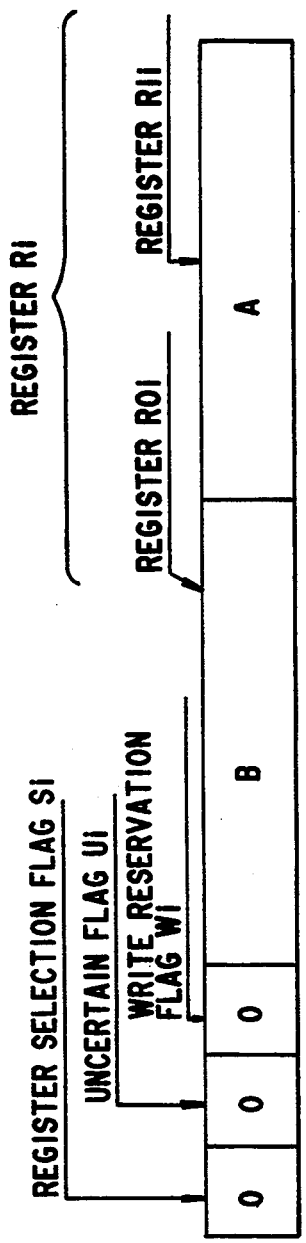
FIGS. 4A to 4D show an explanatory view of change in contents of a register and a flag when data C are written in a register Ri.

FIG. 4A: First, a value B is stored in the register R0i, and a value A is stored in the register R1i. As the register selection flag Si indicates 0, the value B shows new data, and the value A shows old data. As the uncertain flag Ui shows 0, the contents B of the register R0i specified by the register selection flag Si are determined in the execution order of instructions. Besides, as Wi=0, the write to the register R0i is completed.

Figure 4B:

FIG. 4B: The next instruction is executed, and the write reservation flag Wi is set to 1 to reserve the write when a write instruction is decoded.

Figure 4C:
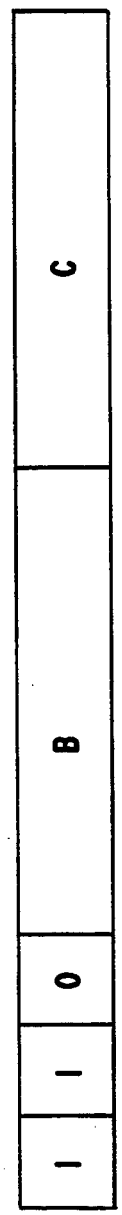

FIG. 4C: The register selection flag Si is set to 1, and the value C indicating an execution result of an instruction is written to the register R1i. When the write is completed, the write reservation flag Wi is set to 0. The uncertain flag Ui as set to 1 to indicate that the write is uncertain in the execution order of instructions.

Figure 4D:

FIG. 4D: The uncertain flag Ui is set to 0 when the write instruction is determined in the execution sequence of instructions.

Figure 5:
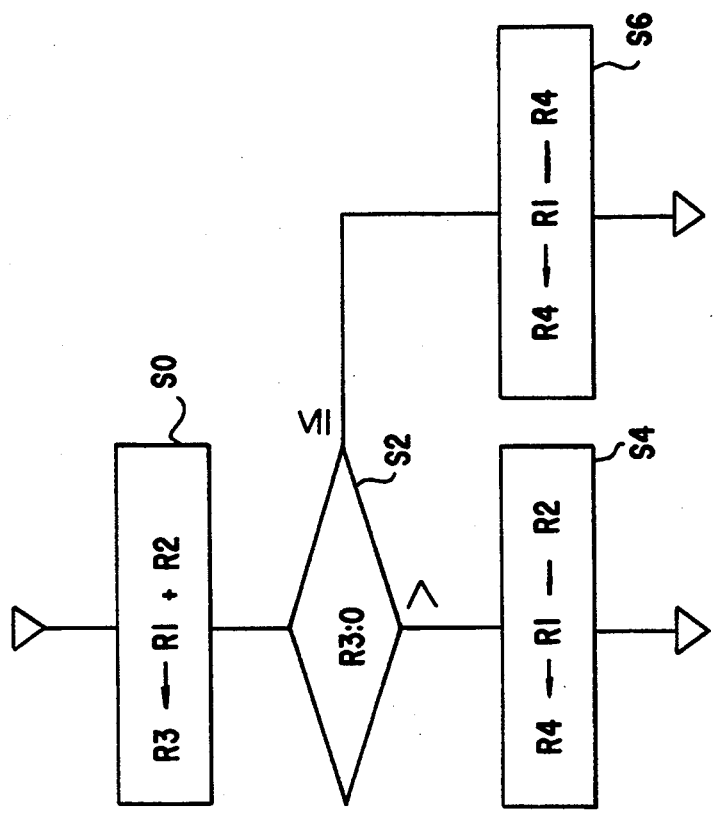
FIG. 5 shows a flowchart for explaining a parallel process of instructions written before and after a branch instruction.

Next, a parallel process of instructions written before and after a branch instruction is described in association with FIG. 5.

In step S0 in a program, the contents of registers R1 and R2 are added and then substituted to a register R3. In step S2, control is passed to step S4 if R3>0. In step S2, control is passed to step S6 if R3≦0.

To execute a program as described above, step S4 is executed in parallel by the operating unit 12 when step S0 is executed by the operating unit 10. The operation result of step S4 is substituted in the register R4, and the contents of the register R4 become undetermined new data.

When R3>0 is determined in step S2, the contents of the register R4 is determined, and the contents of the register R4 obtained from the selector 26 are used. When R3≦0 is determined in step S2, the contents of the register R4 obtained through selector 24 are used to execute step S6.

Thus, instructions written after a branch instruction can be executed in parallel prior to the execution of the branch instruction, thereby improving the performance of the processor.

The present invention has variations of the above described example.

For example, it may comprise three or more sets of operating units for executing steps S0, S2, and S4 in parallel, as shown in FIGS. 4A and 4B.

Also, it may comprise three or more registers R0i, R1i, —, RMi specified with the same address Ai as one set of registers.

Figure 6:
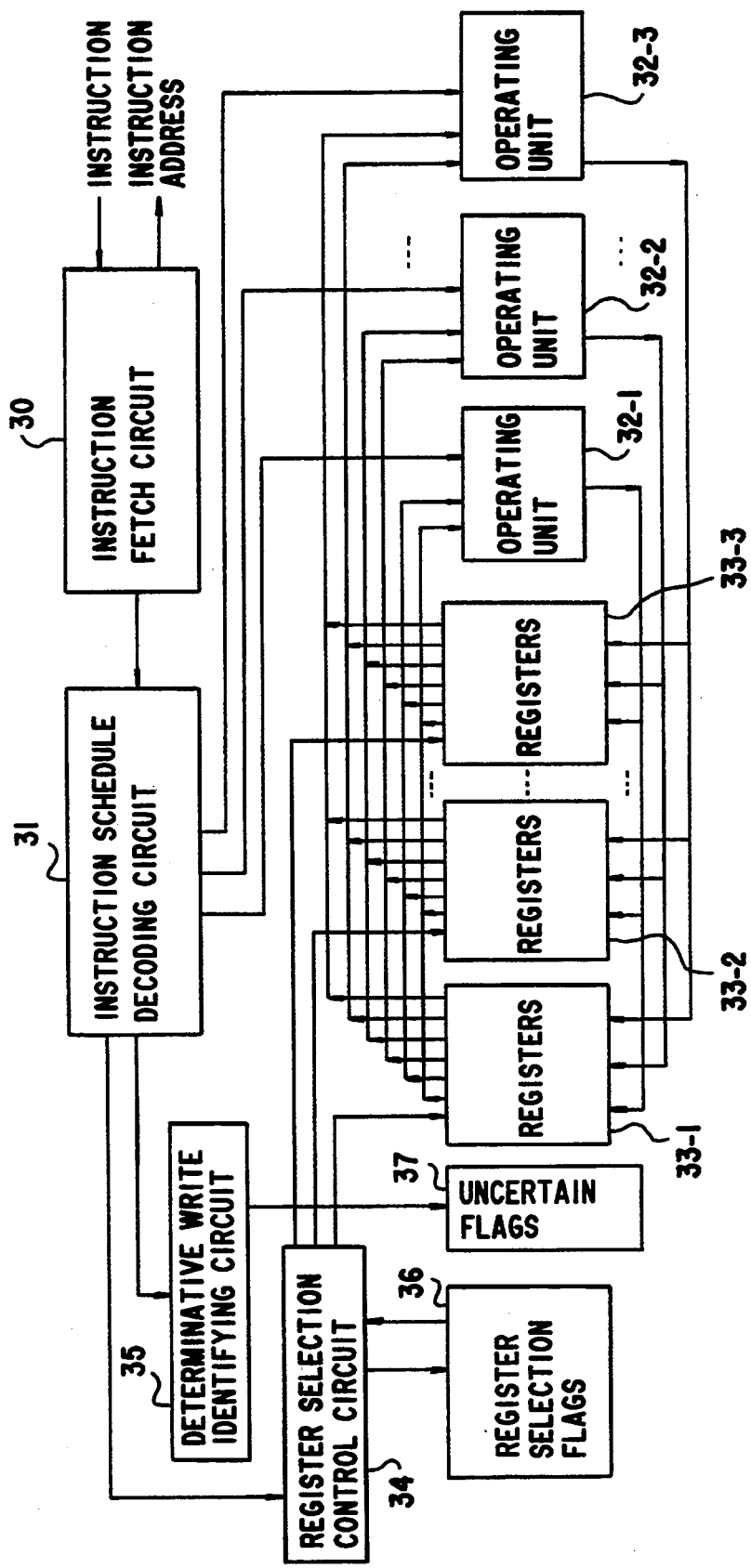
FIG. 6 shows a configuration of a processor of the second embodiment of the present invention.

FIG. 6 shows a configuration of a processor of the second embodiment of the present invention.

An instruction fetch circuit 30 reads an instruction string stored in the main memory. The read address is associated with a program counter provided in the instruction fetch circuit. In the prior art technology, an instruction is read from the main memory with a value of a program counter assumed as an address. In the present invention, those instructions at the addresses following the address specified by the program counter and those instructions in the main memory area specified by the branched address are read. Therefore, the instruction fetch circuit 30 comprises circuits, in addition to a program counter, for outputting following addresses and branched addresses, thus enabling the forward process of instructions using this instruction fetch circuit 30.

Instructions read by the instruction fetch circuit 30 are added to an instruction schedule decoding circuit 31. The instruction schedule decoding circuit 31 decodes an instruction to identify the instruction and make a schedule of operation corresponding to the instruction, and then controls a plurality of operating units 32-1—32-3 according to the operation schedule corresponding to the instruction.

Groups of registers 33-1—33-3 are assigned as described above corresponding to the operating units 32-1—33-3, and simultaneously, available registers are selected by a register selection control circuit 34 and a determinative write identifying circuit 35 using register selection flags 36, thus managing the determination/uncertain flag Ui using uncertain flags 37. When three or more registers 33-1—33-3 or operating units are selected or assigned, they are processed as described above where two units are selected or assigned. For example, in the program shown in FIG. 5, the operating units 32-1, 32-2, and 32-3 are assigned to steps S0, S2, and S4 respectively to execute the instructions in parallel.

Figure 7A:
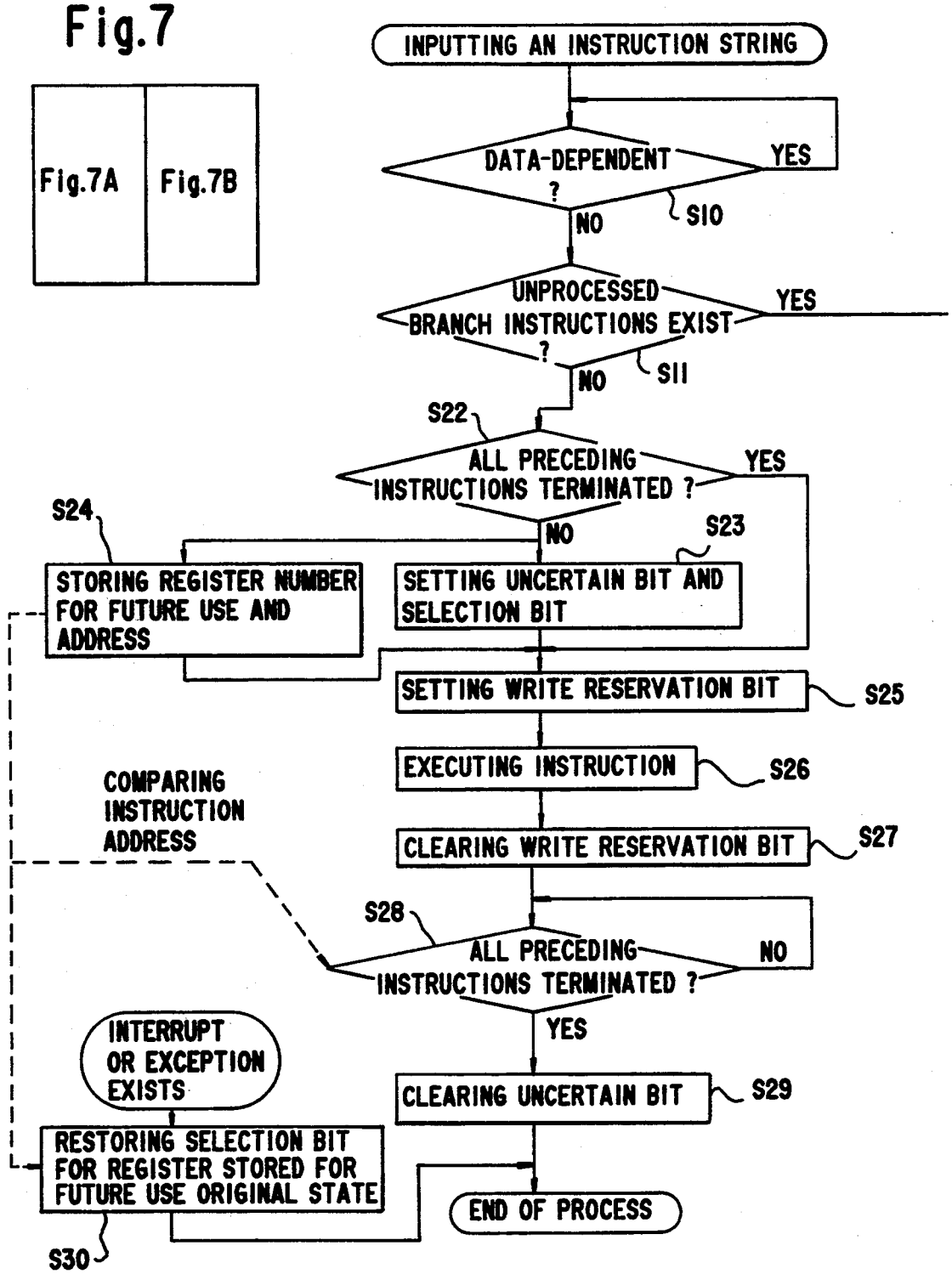
FIG. 7 shows a flowchart of a process of instruction input.
Figure 7B:
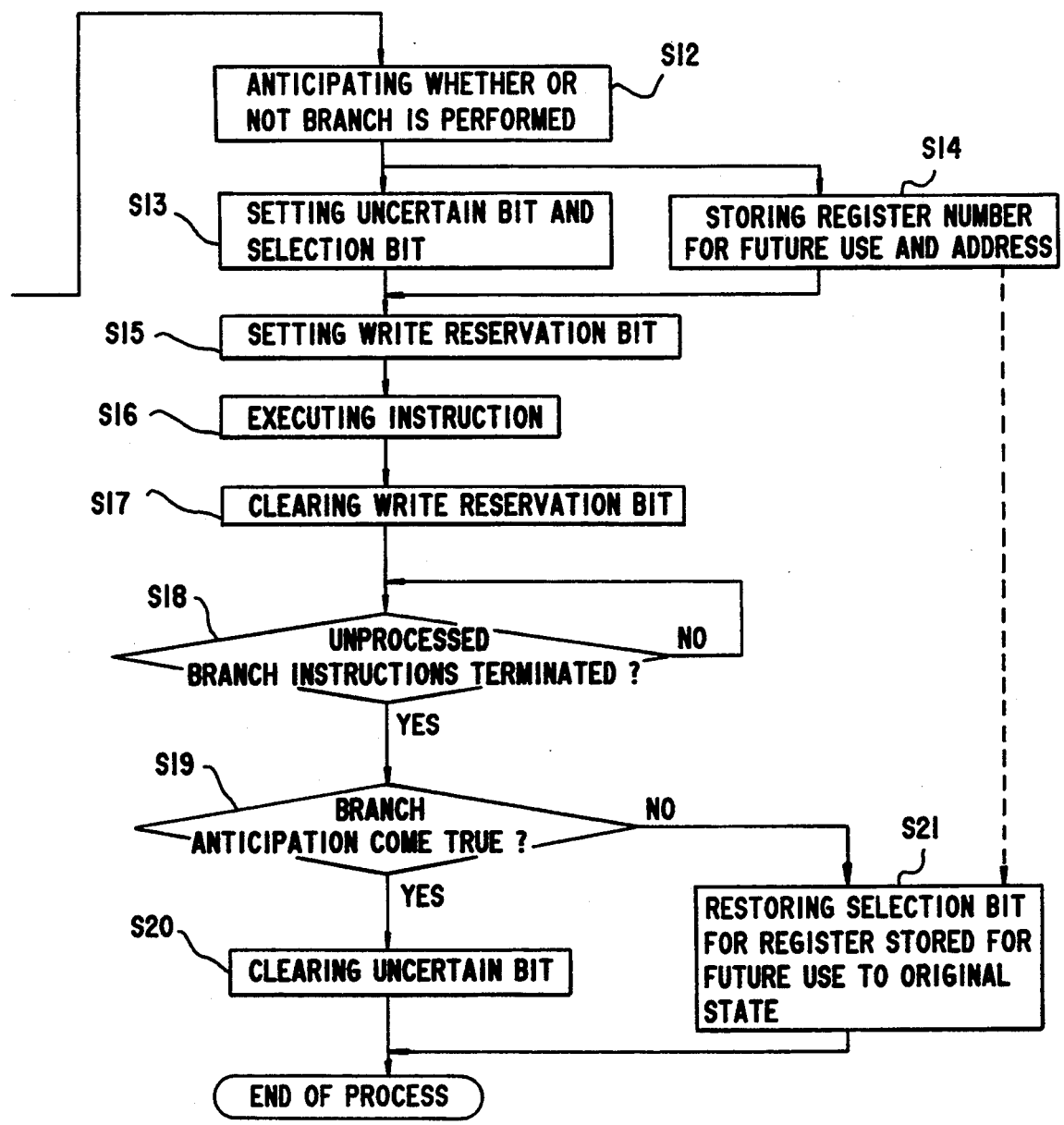

FIG. 7 shows a flowchart of an instruction processing by the instruction schedule decoding circuit 31. The process starts every time an instruction string is input, and it is determined in step S10 whether or not an input instruction relates to the data being processed and is data-dependent. If an instruction to be processed requires the result of an instruction being currently processed, following instructions cannot be processed in parallel. Accordingly, the determination in step S10 must be repeated until the instruction is not data-dependent.

When a current process is completed; data are determined independently of the instruction; or the instruction is not data-dependent from the beginning (NO), and determination is made in step S11 as to whether or not unprocessed branch instructions exist. When an unprocessed branch instruction exists (YES), anticipation is made in step S12 as to whether or not a branch will be made. The anticipation is made for processes where many branches were made in the former processes or where a zero flag is set, etc. As the first embodiment of the present invention shown in FIG. 3 comprises two operating units, the branch pair is selected. When there are many branches as shown in FIG. 6, the process can be performed depending on the existence of a branch. When anticipation is made in step S12, an uncertain flag and a selection bit are set in step S13. That is, each flag is set with a register selection flag of the corresponding operating unit set. Furthermore, as shown in step S14, a register number for future use is reserved in parallel. The reservation is made for the case where the anticipation does not come true, and the restoration is required. After steps S13 and S14, the write reservation bit for the register stored in step S14 is set in step S15. In step S16, operating units are instructed to execute instructions and actually execute the instructions. On completion of the instructions, an available destination register is determined, and then the write reservation bit is cleared in step S17. As all processes from steps S12 to S17 assume an unprocessed branch instruction in the process flow, determination must be made in step S18 as to whether or not the unprocessed branch instruction is successfully terminated to determine an uncertain bit or where the anticipation of a branch does not come true. If the uncertain bit is determined before the unprocessed instruction terminates, the next instruction is unexpectedly executed against the purpose. The determination in step S18 is made prevent this. It is repeated in step S18 until the unprocessed branch instruction terminates.

When the unprocessed branch instruction terminates (YES), determination is made in step S19 as to whether or not the anticipation of a branch comes true. If it does (YES), the uncertain bit is cleared in step S20. If it does not come true (NO), the selection bit for a register for future use defined in step S14 is restored in step S21, thus regenerating the register for future use.

After steps S20 and S21, processes of the current instruction terminate.

When no unprocessed branch instructions are detected in the determination in step S11 (NO), determination is made in step S22 as to whether or not all the preceding instructions are terminated. The steps after S22 are performed when the out-of-order, that is, irregular execution of instructions is permitted in the program sequence. When not all of them are terminated (NO), an uncertain bit and a selection bit are set in step S23 as indicated in steps S13 and S14. In this case, a register number for future use and an instruction address are reserved as indicated in steps S24, as in the above described step S14, to be used in steps S28 and S30 described later.

A write reservation bit is set in step S25; instructions are directed to be executed in step S26 and then the instructions are executed by operating units; and the write reservation bit is cleared in step S27. In step S28, determination is made as to whether or not all the preceding instructions terminate successfully. If they do not, the process in step S28 is repeated. The determination in step S28 means the comparison between the address in step S23 and that of the next executable instruction. If all the preceding instructions terminate successfully, the uncertain bit is cleared and the process terminates in step S29.

Thus, in the above described operation, instructions can be processed forward in the presence of branch instructions.

If interrupt or exception occurs during the forward execution of instructions, the present execution must be suspended. If the execution is suspended during the forward execution of instructions, registers are also interrupted, thus requiring another register. Therefore, in the case of an interrupt, etc., the selection bit of the register reserved for future use in step S24 is restored to the original state in step S30, and the instructions are executed.

In the above embodiment, the register file has a configuration of 4-port read and 2-port write, Generally, a configuration of 2N-port-read and N-port-write is considered desirable when N sets of operating units are used.

As described above, a processor to which the present invention is applied enables an instruction after a branch process to be processed in parallel before it executes the branch instruction is executed, thus resulting in a greatly improved processor performance.

Besides, with the above described write reservation flags and a write reservation identifier, the processor can easily control the write conflict to a register of the same address in the parallel process.

What is claimed is:

1. A processor having a plurality of operating units, said processor for performing a parallel process, and for processing in parallel, before performing a branch instruction, an instruction after the branch instruction, said processor comprising:

a plurality of registers including plural sets of registers that are specified with a same address;

a plurality of selection sequence storing means including a selection sequence storing means provided for each of said register sets, said selection sequence storing means for indicating a former selection sequence of each set and being specified with a register specification address;

a plurality of determination identification storing means including a determination identification storing means provided for each of said register sets and being specified with a register specification address, wherein said determination identification storing means determines execution result of said operating units when execution of one of said operating units is selected before result of an execution instruction is determined;

a register selection control means for selecting one of said register sets according to contents of said selection sequence storing means at said register specification address when data are written to said registers, and for updating contents of said selection sequence storing means; and a determinative write identifying means for rewriting contents of said determination identification storing means of said register specification address depending on whether or not said rewriting is determined as correct in an order of execution instructions.

2. A processor having a plurality of operating units, said processor for performing a parallel process, and for processing in parallel, before performing a branch instruction, an instruction after the branch instruction, said processor comprising:

a plurality of registers including plural sets of registers that are specified with a same address;

a plurality of selection sequence storing means including a selection sequence storing means provided for each of said register sets, said selection sequence storing means for indicating a former selection sequence of each set and being specified with a register specification address;

a plurality of determination identification storing means including a determination identification storing means provided for each of said register sets and being specified with a register specification address, wherein said determination identifying means restores contents of a corresponding register to contents before execution of said operating unit when no-execution of said operating unit is selected before result of an execution instruction is determined;

a register selection control means for selecting one of said register sets according to contents of said selection sequence storing means at said register specification address when data are written to said registers, and for updating contents of said selection sequence storing means; and a determinative write identifying means for rewriting contents of said determination identification storing means of said register specification depending on whether or not said rewriting is determined as correct in an order of execution instructions.

3. A processor having a plurality of operating units, said processor for performing a parallel process, and for processing in parallel, before performing a branch instruction, an instruction after the branch instruction, said processor comprising:

a plurality of registers including plural sets of registers that are specified with a same address;

a plurality of selection sequence storing means including a selection sequence storing means provided for each of said register sets, said selection sequence storing means for indicating a former selection sequence of each set and being specified with a register specification address;

a plurality of determination identification storing means including a determination identification storing means provided for each of said register sets and being specified with a register specification address;

a register selection control means for selecting one of said register sets according to contents of said selection sequence storing means at said register specification address when data are written to said registers, and for updating contents of said selection sequence storing means;

a determinative write identifying means for rewriting contents of said determination identification storing means of said register specification depending on whether or not said rewriting is determined as correct in an order of execution instructions;

a plurality of write reservation flags comprising a write reservation flag for each of said register sets for indicating whether or not a write reservation is made to each said register set; said write reservation flag corresponding to each register set being specified with a register specification address; and a write reservation identifying means for rewriting contents of said write reservation flag when data is written to each said register set wherein indicating a write reservation when a write instruction is decoded, and indicating release of said reservation on completion of the rewriting.

4. A processor according to claim 3, wherein said determination identification storing means determines an execution result of one of said operating units when the execution of said operating unit is selected before the result of an instruction is determined.

5. A processor according to claim 3, wherein said determination identification storing means restores contents of a corresponding register to contents before execution of said operating unit when no-execution of one of said operating units is selected before result of an execution instruction is determined.

6. A processor according to claim 3, wherein said processor comprises a determining means for determining whether or not an input instruction depends on resultant data of an execution instruction currently being executed, and, if said input instruction does depend upon resultant data, repeats said determination until said input instruction becomes independent of said resultant data.

7. A parallel processing method of a parallel processor, having a plurality of operating units, for performing a parallel process and for processing in parallel, before performing a branch instruction, an instruction after the branch instruction, said parallel processing method comprising the steps of:

a first step of determining whether or not an input instruction depends on resultant data of an instruction currently being executed, and, if said input instruction does depend on resultant data, waiting until said input instruction becomes independent of said resultant data;

a second step of determining whether or not an unprocessed conditional branch instruction exists when said input instruction depends on the resultant data of said instruction currently being executed;

a third step of anticipating whether or not, if an unprocessed conditional branch instruction exists, said branch instruction is executed;

a fourth step of setting an uncertainty bit indicating that contents of a register used for an operating unit are not determined, setting data indicating selection of said register, and setting a reservation bit indicating a busy state of said register, to execute an instruction corresponding to a result anticipated; and then, resetting said reservation bit;

a fifth step of determining whether or not said result anticipated comes true when an unprocessed branch instruction terminates, clearing said uncertainty bit when said result anticipated comes true, restoring said register to original values, and restoring said data indicating said selection to the original values;

a sixth step, executed when no unprocessed branch instructions exist, of setting said uncertainty bit, selection data, and write reservation bit when a preceding instruction is not terminated, executing an input instruction, and then resetting said reservation bit when no unprocessed branch instruction is determined to exist; and a seventh step of clearing said uncertainty bit when all instructions preceding said input instruction terminate.

8. A parallel processing method of a parallel processor according to claim 7, wherein selection data referring to a register reserved for future use is restored to an original state during said parallel process when at least one of an interrupt or an exception process occurs.

* * * * *